March 7, 1939.   S. S. GREEN   2,149,288
ADJUSTABLE DAMPING ARMATURE FOR WATT-HOUR METERS
Filed March 8, 1937
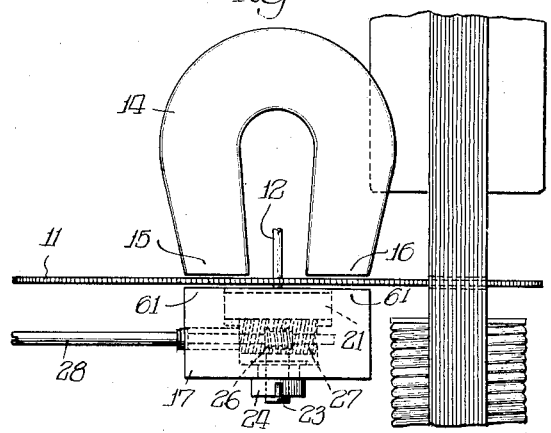
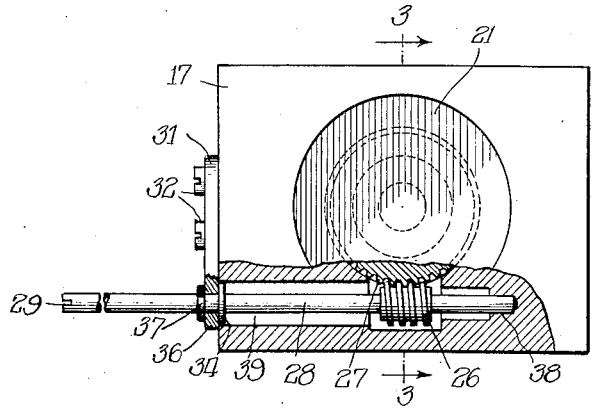
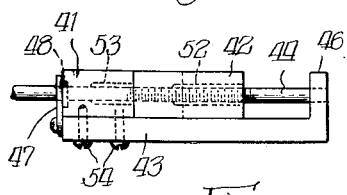
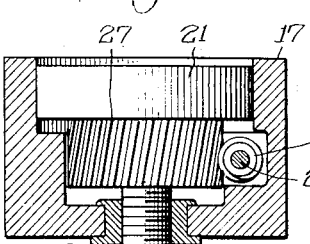
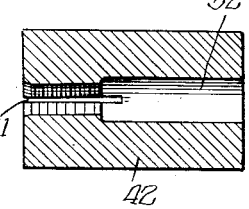
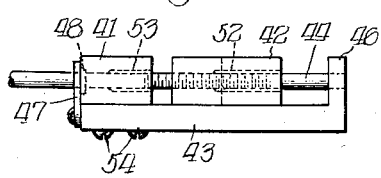
Inventor:
Stanley S. Green
By Louis Robertson
Atty

UNITED STATES PATENT OFFICE 2,149,288

ADJUSTABLE DAMPING ARMATURE FOR WATT-HOUR METERS

Stanley S. Green, La Fayette, Ind., assignor to Duncan Electric Manufacturing Company, La Fayette, Ind., a corporation of Illinois Application March 8, 1937, Serial No. 129,585

10 Claims. (Cl. 171—34)

This invention relates to watt-hour meters and particularly to an adjustable armature for a damping magnet therein for controlling the density of magnetic flux which cuts the meter disc to inductively oppose the rotation of the disc. It should be understood that meter discs are held down to a speed proportional to the power consumption by damping magnets which must be delicately adjusted to make the meter accurate.

In applicant's copending applications, maturing in Patents Nos. 2,110,417 and 2,110,418, a damping magnet arrangement was disclosed comprising a horseshoe or U-shaped magnet having both poles adjacent one face of the disc with the magnet extending steeply away from the disc and a soft iron block called an armature positioned adjacent the other face of the disc opposite the poles of the magnet so that the magnetic flux passes from one pole of the magnet down through the disc, laterally through the armature and up through the disc to the other pole of the magnet. It will be observed that this damping magnet arrangement produces two opposed adjacent fields cutting the disc, so that portions of the disc pass rapidly from one field to the opposed field. This makes the damping more effective than if equal fields were widely separated. The present invention utilizes this same advantageous damping arrangement, and this application may therefore be considered a continuation in part of applicant's above mentioned prior applications.

The present application, however, discloses improvements for use with said arrangement, said improvements having to do with the adjustment of the armature to vary the damping effect so as to adjust the meter. It should be understood that it is common practice to adjust watt-hour meters by varying the amount of damping flux which passes through the disc. Heretofore this type of adjustment has usually been accomplished by shunting part of the flux from one pole to another of the magnet system or, in other words, by diverting it from the disc. That form of adjustment, however, has a disadvantage in that it is not practical to remove the soft iron shunt member so far from the magnet that it will not continue to shunt a substantial amount of magnetic flux away from the disc, and hence a damping arrangement including such a shunt never quite attains its full damping possibilities, that is, it never forces the maximum possible amount of flux through the disc.

A movable armature has also been used, but the armature was moved by screwing it up and down and it was therefore made round with the result that the maximum damping torque could not be obtained. A circular armature is not as efficient as a rectangular armature which in effect fits the poles of the magnet.

One object of the present invention is to provide means for adjusting a damping magnet system in such a way as to obtain the maximum damping effect therefrom when desired. Two forms of the invention have been illustrated for accomplishing this object. In both forms the armature, comprises relatively movable parts which in their full damping positions act substantially as a one-piece rectangular armature positioned in its most effective position. There is no adjusting shunt or other magnetic member positioned in a disadvantageous position such as would divert some of the flux from the disc.

Another object of the invention is to provide satisfactory means for adjusting the damping force to extremely fine adjustments and preferably without backlash in the adjusting movements. According to one form of the invention this is accomplished by providing a round plug 21 vertically movable within the armature block 17 and screwing up and down therein, being turned by a worm gear 26 which is kept under resilient tension by flexed shaft 28. According to another form of the invention (Figs. 4 to 6), which is also in part a continuation of applicant's copending applications mentioned, the delicate adjustment is accomplished by laterally separating two portions 41 and 42 of the armature, the separation being accomplished by a screw 44 which may be resiliently flexed to prevent backlash. The flexing of the shaft to prevent backlash of a damping adjustment member is a feature covered in applicant's copending application Serial No. 37,669.

Other objects and advantages of the invention will be apparent from the following description and from the drawing, in which:

Fig. 1 is a side elevation of a damping magnet system applied to a meter disc.

Fig. 2 is a plan view of the armature shown in Fig. 1 partially broken away.

Fig. 3 is a sectional view substantially on the line 3—3 of Fig. 2.

Fig. 4 is a fragmentary side elevational view of a modified form of adjusting armature.

Fig. 5 is a view similar to Fig. 4 but showing the armature in a flux reducing position; and Fig. 6 is a sectional view of the movable armature block of Figs. 4 and 5.

Although this invention may take numerous forms, only two have been chosen for the purpose of illustration. Both of these forms are adapted for use in connection with a meter disc 11 which is carried by rotatably mounted shaft 12 and driven by the usual driving magnets, not shown. It is customary to provide a permanent damping magnet for retarding the rotation of the disc, and in the present instance this magnet is a horseshoe shaped magnet 14 having its two pole portions 15 and 16 adjacent the upper face of the disc 11. It will be understood of course that these pole portions are positioned near the periphery of the disc and are at the same distance from the center of the disc so that a given portion of the meter disc rotates from adjacent one pole portion 16 to adjacent the other pole portion 15. An armature block 17 is positioned adjacent the under face of the disc opposite the pole portions 15 and 16 so as to form a low reluctance path for the flux for the magnet 14, from the pole 15 through the disc to the armature block 17 through the armature block and back up through the disc to the pole portion 16. Applicant's Patent No. 2,110,418 illustrated a suitable frame for supporting the magnet 14 and an armature block in the proper positions, said frame being supported by a driving unit and also rotatably carrying the disc so that accuracy of positioning of the various parts was assured. A similar frame could be used here.

The present invention is concerned with the adjustment of the armature block 17 to control the amount of flux passing through the disc 11. In the form shown in Figs. 1 to 3 this is accomplished by means of a cylindrical plug 21 which may be raised and lowered in the armature block 17 which closely fits the plug 21. When the plug 21 is raised to a position flush with the top of the block 17, the effect is substantially the same as a solid block. If the armature block 17 is substantially the same shape as the outer outlines of the pole portions 15 and 16, the damping force may be the maximum attainable with the magnet 14 since there is no magnetic metal, such as adjusting shunts, positioned to divert any magnetism from the meter disc.

The plug 21 may be raised and lowered in several different ways. The manner at present preferred is to have it carried by a screw 23 screwing into a collar 24 secured to the block 17 as seen in Fig. 3. The plug 21 may be rotated so as to be screwed up and down by a worm gear 26, seen best in Fig. 2, which meshes with teeth 27 on the plug. The teeth 27 are not concave as is usual with worm teeth but are shaped to conform to a cylindrical outline concentric with the screw 23 so that as the plug is raised and lowered the teeth 27 will fit the worm gear 26 uniformly.

The worm gear 26 is rotated by a handle 28 which extends to the forward end of the meter and is provided at its end with a screw driver slot 29 to facilitate adjustment of the meter.

It is desirable that the adjustment of the meter be substantially free from backlash. To this end backlash is prevented at all points. At the screw 23 backlash is prevented by making the collar 24 in the form of a split collar at its lower end with the threads so proportioned that the collar 24 must be sprung slightly by the screw 23. The worm thread of the worm gear 26 or the teeth 27 may be made slightly oversize and beveled so that if they are urged tightly together there will be no backlash. They are urged tightly and resiliently together by means of a journal plate 31 which may be secured to the block 17 by screws 32, the screw holes in the block 17 being so positioned that the adjusting rod 28 must be sprung slightly for said screws to be inserted. Backlash by longitudinal movement of the shaft 28 may be prevented by squeezing the plate 31 between a collar 34 formed on the shaft and a ring 36 which may be squeezed into an annular groove 37 in the rod 28, the ring 36 being of a material such as brass which will flow under pressure so that it can be slipped over the end of rod 28 and then reduced in size by pressure and caused to press sufficiently firmly against the bracket 31. It should be observed that the other end of rod 28 is journaled in the armature block 17 as seen in Fig. 2.

The assembly of this armature unit is very simple, the collar 24 first being applied to the block 17 and being upset therein, the plug 21 then being screwed into the collar 24 and the rod 28 with the bracket 31, and worm gear 26 already secured thereto being then inserted through a hole 39 in the armature 17 so that its end fits into the journal socket 38 therein. The rod 28 is then sprung slightly to the position shown in Fig. 2, and the screws 32 applied.

The form shown in Figs. 4 to 6 is similar to that shown in Figs. 1 to 3 in that the armature includes two relatively movable portions and in that maximum breaking torque may be secured by it since it requires no magnetic members positioned to divert magnetism from the disc or form the most effective path for the magnetism. In this form the armature may comprise a stationary block 41 and a movable block 42. The stationary block 41 may be secured to a frame member 43 (which could be an integral part of the main meter frame if desired). The movable block 42 slides on this frame member 43 and is operated by a screw 44 journaled at one end in a bracket portion 46 formed on the plate 43 and at the other end in the block 41. All longitudinal backlash may be removed by a plate 47 which may clamp against a collar 48 formed on the screw 44. The screw 44 is secured to the front of the meter as is the rod 28 of Fig. 2 and provided with a screw driver slot in its end.

In order to completely eliminate backlash the movable block 42 may be split at one end as by a slot 51 seen in Fig. 6 and the split ends sprung inwardly so that they will resiliently clamp the screw 44. Threads may be provided on this portion of the block 42 to engage the screw 44, and the remainder of the hole 52 through the block 42 may be enlarged so as not to engage the screw 44. In order to press the block 42 firmly against the slide plate 43 the threaded hole therein may be centered a thousandth of an inch or so higher than in the block 41. In case the resiliency of the split end portion of the block 42 might not be sufficient to accommodate this difference in the positions of the holes, the hole through the block 41 may be enlarged at the end adjacent block 42 as shown at 53 in Fig. 4. This will result in flexing the screw 44 slightly as the block 41 is drawn down against the plate 43 by the screws 54.

*Operation*

To adjust the damping effect of the magnetic system of Figs. 1 to 3 it is merely necessary to turn the rod 28 by a screw driver inserted into the slot 29. This rotates the worm gear 26, which in turn rotates the plug 21, which by this rotation is screwed up or down. When it is in the upper position flush with the top of the armature block 17 the maximum damping effect is obtained. As it is lowered the damping effect is decreased in two ways. One cause of decreased damping effect is that the total flux passing through the disc is decreased because as the plug 21 is lowered it recedes from the pole portions 15 and 16 and the flux would have a longer gap to jump from the poles to the plug 21. Another aspect resulting in decrease of damping torque is that the concentrated portions of the opposed fields cease to be so closely spaced. In other words, it may be that the flux from the outside portions of the poles 15 and 16 to the armature block 17 will be just as concentrated as before or possibly even more concentrated, but it will be apparent from Fig. 1 that these concentrated flux areas, which for the most part are immediately over the leg portions 61 of the block 17, are about twice as far apart as the concentrated portions of the field immediately under the inner edge of the poles 15 and 16. It follows that a portion of the disc does not pass nearly so quickly from one concentrated field into an opposed concentrated field and therefore the damping torque is not nearly so great. Of course, the amount of variation can be increased somewhat if necessary by increasing the diameter of the plug 21.

With the armature of Figs. 4 to 6 maximum flux and maximum damping torque are obtained when the two portions of the armature are adjacent one another as shown in Fig. 4. As the screw 44 is turned the movable block 42 is slid away from the fixed block 41, thus forming an air gap between the blocks, which greatly increases the reluctance of the path through the armature and accordingly decreases the amount of flux flowing therethrough. Of course, a similar result could be obtained by making the blocks 41 and 42 in one piece and sliding or pivoting this one piece away from its most effective position. It is believed that if the threads on screw 44 are of fairly fine pitch the movement of the block 42 will be about at the most convenient speed. If it should be too fast, however, this could be remedied by using a differential screw having coarse threads in the block 41 and fine threads of the same direction in the block 42, as described in applicant's Patent No. 2,110,418 resulting from a copending application.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. A watt-hour meter including a rotatably mounted disc, a magnet having two poles adjacent one face of said disc, an armature opposite said poles and adjacent the other face of said disc, said armature comprising two relatively movable magnetic parts for controlling the damping of said disc, and screw means operable from the front of the meter and substantially free from backlash for moving one of said relatively movable parts.

2. A watt-hour meter including a rotatably mounted disc, a magnet having two poles adjacent one face of said disc, an armature opposite said poles and adjacent the other face of said disc, said armature comprising two relatively movable magnetic parts for controlling the damping of said disc, and screw means for moving one of said relatively movable parts.

3. A watt-hour meter including a rotatably mounted disc, a damping magnet having both poles adjacent one face of the disc, an armature opposite said poles and adjacent the other face of the disc, and including an armature block whose upper face lies substantially within the projection of the outer edges of said poles, and a cylindrical plug within said block and movable from a position substantially flush with said face to a position substantially removed therefrom for controlling the damping of said disc.

4. A watt-hour meter including a rotatably mounted disc, a damping magnet having both poles adjacent one face of the disc, an armature opposite said poles and adjacent the other face of the disc, and including an armature whose face nearest the disc lies substantially within the projection of the outer edges of said poles, and is shaped to provide approximately the maximum damping torque available from the magnet, and means for moving at least a part of said armature to a less effective position to adjust the meter.

5. A watt-hour meter including a rotatably mounted disc, a damping magnet having both poles adjacent one face of the disc, an armature opposite said poles and adjacent the other face of the disc, and including a block whose upper face lies substantially within the zone opposite the outer edges of said poles, a cylindrical plug within said block and movable from a position substantially flush with said face to a position substantially removed therefrom for controlling the damping of said disc, and screw means operable from the front of the meter for moving said plug.

6. A watt-hour meter comprising a torque producing electromagnet, a disc driven by the electromagnet and capable of continuous rotation, a damping magnet for said disc, said magnet being of general horseshoe shape with its ends close together and its end faces comprising pole faces both of which are adjacent one face of the disc and with the magnet extending steeply away from the disc and having an armature cooperating with said pole faces adjacent the opposite face of the disc and at least part of the armature being movable with respect to said magnet for adjustment.

7. A watt-hour meter comprising a torque producing electromagnet, a disc driven by the electromagnet and capable of continuous rotation, a damping magnet for said disc, said damping magnet being of general horseshoe shape with its ends close together and its end faces comprising pole faces both of which are adjacent one face of the disc and with said magnet extending steeply away from said disc, and an armature of substantially rectangular shape and positioned adjacent the opposite face of the disc approximately within the projections of the outer edges of said pole faces whereby approximately the maximum damping torque may be obtained from said damping magnet.

8. A watt-hour meter comprising a torque producing electromagnet, a disc driven by the electromagnet and capable of continuous rotation, a damping magnet for said disc, said magnet being of general horseshoe shape with its ends close together and its end faces comprising pole faces both of which are adjacent one face of the disc and with the magnet extending steeply away from the disc and having an armature cooperating with said pole faces adjacent the opposite face of the disc, positioned substantially within the projection of the pole faces through the disc, and at least part of the armature being movable with respect to said magnet for adjustment.

9. A watt-hour meter mechanism of the general type including a driving unit, a frame secured to the driving unit, a disc rotatably carried by the frame, a damping magnet carried by the frame with opposed poles adjacent one face of the disc and an armature carried by the frame adjacent the other face of the disc and opposite to the poles, characterized by the division of the armature into two relatively movable magnetic portions which overlap in the direction of the relative movement whereby any magnetic separation of the portions is less than their relative movement.

10. A watt-hour meter including a rotatably mounted disc, a magnet having two poles adjacent one face of said disc, an armature opposite said poles and adjacent the other face of the disc, said armature comprising two magnetic portions which are at least partially separated by an air gap with one of the portions opposite each of the magnet poles, and a magnetic plug movable within the air gap to increase and decrease the reluctance to the flow of magnetism between said portions.

STANLEY S. GREEN.